(12) United States Patent
Falkenå et al.

(10) Patent No.: US 9,037,697 B2
(45) Date of Patent: May 19, 2015

(54) SUBSCRIPTION HANDLING FOR THE IP MULTIMEDIA SUBSYSTEM

(75) Inventors: Jonas Falkenå, Huddinge (SE); Per Roos, Järna (SE); Tomas Holm, Älvsjö (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 255 days.

(21) Appl. No.: 13/640,629

(22) PCT Filed: Dec. 1, 2010

(86) PCT No.: PCT/EP2010/068654
§ 371 (c)(1),
(2), (4) Date: Dec. 3, 2012

(87) PCT Pub. No.: WO2011/128003
PCT Pub. Date: Oct. 20, 2011

(65) Prior Publication Data
US 2013/0067057 A1    Mar. 14, 2013

Related U.S. Application Data

(60) Provisional application No. 61/323,559, filed on Apr. 13, 2010.

(51) Int. Cl.
*G06F 15/173*    (2006.01)
*H04L 29/06*    (2006.01)

(52) U.S. Cl.
CPC ........ *H04L 65/1016* (2013.01); *H04L 65/1063* (2013.01)

(58) Field of Classification Search
CPC ................ H04L 65/1063; H04L 65/1016
USPC ............................................. 709/223
See application file for complete search history.

(56) References Cited

U.S. PATENT DOCUMENTS

| | | | |
|---|---|---|---|
| 2007/0250884 A1* | 10/2007 | Qiu et al. | 725/106 |
| 2009/0227241 A1 | 9/2009 | Fersman et al. | |
| 2010/0332614 A1 | 12/2010 | Holm et al. | |
| 2011/0170505 A1* | 7/2011 | Rajasekar et al. | 370/329 |

OTHER PUBLICATIONS

3GPP TS 29.199-3 V8.2.0 (Sep. 2009).*
http://www.w3.org/Submission/WS-Eventing (Mar. 15, 2006).*

* cited by examiner

*Primary Examiner* — Hee Soo Kim (57) ABSTRACT

Embodiments of the present invention include controlling user subscriptions within an IMS Application Server of an IP Multimedia Subsystem, IMS, network, via an Open Service Access Application Programming Interface, API, between the IMS network and a web-based application. Embodiments include subscribing a set of users by sending a start subscription message from said web-based application to the IMS network, the start subscription message including an address for each user in the set. An acknowledgement of the subscription is sent from the IMS network to said web-based application, the acknowledgement including a correlator uniquely identifying the subscribed set of users within the IMS network. A subscription for one or more users of the set is terminated by sending a stop subscription message from said web-based application to the IMS network, the stop subscription message including the address of the or each user for which the subscription is being stopped.

29 Claims, 5 Drawing Sheets

SUBSCRIPTION HANDLING FOR THE IP MULTIMEDIA SUBSYSTEM

This application claims the benefit of U.S. Provisional Application No. 61/323,559, filed Apr. 13, 2010, the disclosure of which is fully incorporated herein by reference.

TECHNICAL FIELD

The present invention relates to subscription handling for the IP Multimedia Subsystem and more particularly to such subscription handling enabled by the 3GPP Open Service Access requirements.

BACKGROUND

IP Multimedia services provide a dynamic combination of voice, video, messaging, data, etc. within the same session. By growing the number of basic applications and the media which it is possible to combine, the number of services offered to the end subscribers will grow, and the inter-personal communication experience will be enriched. This will lead to a new generation of personalised, rich multimedia communication services, including so-called "combinational IP Multimedia" services.

IP Multimedia Subsystem (IMS) is the technology defined by the Third Generation Partnership Project (3GPP) and ETSI TISPAN group to provide IP Multimedia services over mobile communication networks. IMS provides key features to enrich the end-subscriber person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between subscriber terminals (or subscriber terminals and IMS Application Servers). The Session Description Protocol (SDP), carried by SIP signalling, is used to describe and negotiate the media components of the session. Whilst SIP was created as a subscriber-to-subscriber protocol, IMS allows operators and service providers to control subscriber access to services and to charge subscribers accordingly.

Figure 1:
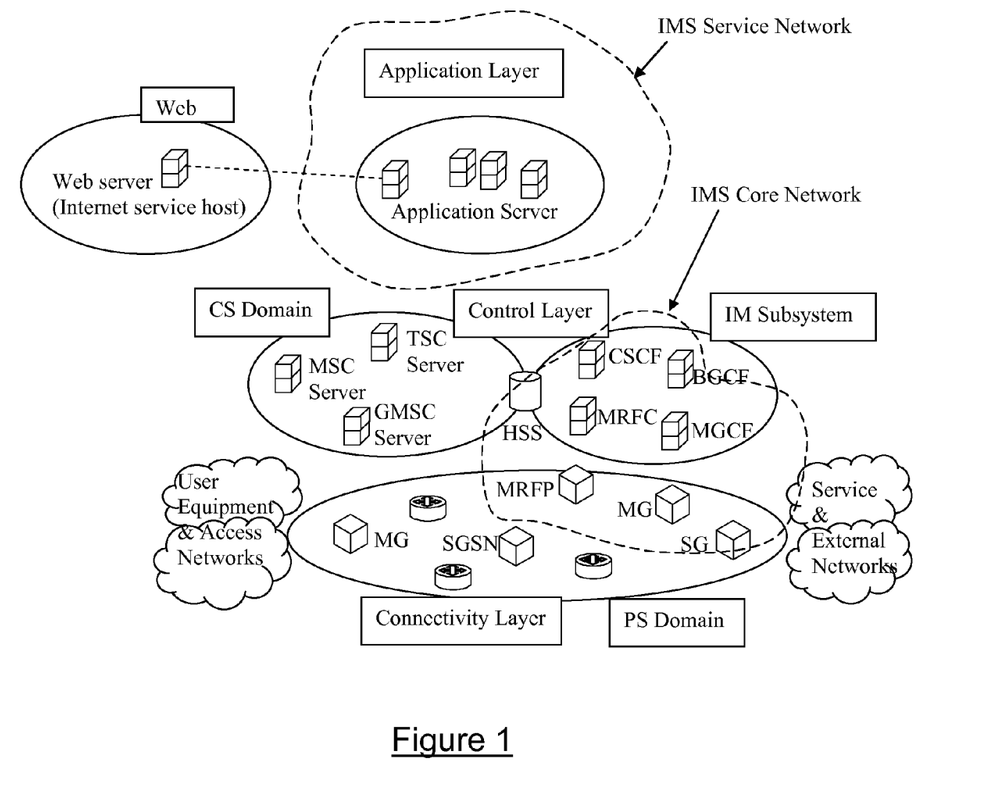
FIG. 1 illustrates schematically an IMS network integrated into a network comprising user access networks, a GPRS core network, and a web access network comprising a web server for interacting with the IMS network.

By way of example, FIG. 1 illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the subscriber that the subscriber is subscribed to; and the Interrogating CSCF (I-CSCF) whose role is to identify the correct S-CSCF and to forward to that S-CSCF a request received from a SIP terminal via a P-CSCF.

Within the IMS service network, IMS Application Servers (ASs) are provided for implementing IMS service functionality. IMS Application Servers provide services to end users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment (or indeed for the purpose of any SIP method, session or non-session related). The IFCs are received by the S-CSCF from an HSS during the IMS registration procedure as part of a subscriber's Subscriber Profile.

An example IMS service that is facilitated by the use of ASs is that of Multimedia Telephony (MMTel). MMTel allows a single SIP session to control virtually all MMTel supplementary services and MMTel media. All available media components can be easily accessed or activated within the session. Employing a single session for all media parts means that no additional sessions need to be set up to activate video, to add new users, or to start transferring a file.

The provision of new IMS-based services by network operators and third party service providers has conventionally required a detailed technical knowledge of SIP and IMS protocols and network architectures. In order to simplify this process, and therefore increase the range of IMS services and the speed with which they can be introduced, the Third Generation Partnership Project (commonly known as 3GPP) has been working on a so-called Open Service Access (OSA) architecture. The object of the OSA work has been to provide a set of (sometimes freely available) Application Programming Interfaces (APIs) that will allow systems developer that are unfamiliar with the IMS/SIP architecture and standards to develop applications that can make use of the IMS network and its services. These APIs can be considered relatively high level abstractions of the underlying mechanisms and as such should be simple to use. The APIs are often referred to as "handlers".

To date, 3GPP has described a number of such APIs (currently 22). These are specified in 3GPP TS 29.199-3 V8.2.0 and all are based on Parlay X. Parlay X is a set of Web service APIs specified by a group including 3GPP and ETSI. The OSA APIs can be used in interactions between an IMS Application Server and a "north bound" value added service server (hereafter referred to as 'VAS'). The OSA APIs are intended to be powerful but nonetheless easy to use. A designer of a VAS service does not have to learn the details of SIP or IMS to be able to design services for such environments.

By way of example, the OSA architecture may be used to implement a "click to call" service, whereby a user initiates a call between himself/herself and a third party by clicking a link on a web page. The request is routed, via the Internet, to the VAS which instructs an MMTel AS, using the appropriate OSA API (e.g. "MakeCallSession", with the addresses of the peer users as argument) to set up the call between the parties. In practice, the MMTel AS will send a SIP INVITE to the initiator's IMS enabled terminal. When the user answers the call, connection to the peer user is initiated over the IMS network.

The 'CallNotification' API (TS 29.199-3) describes in 'CallNotificationManager' a subscription handler to be used between an IMS system and the VAS. Such a subscription may be used, for example, to alert the VAS of incoming calls directed to a particular user, where the VAS determines a call handling procedure on behalf of the MMTel. The VAS starts a subscription by sending a 'StartCallNotificationRequest' handler. This API contains a unique reference for the subscription and may include several user addresses (typically URIs) in one request. The AS handling the subscription acknowledges the request to the VAS, providing the VAS with a "correlator" identifying the particular subscription. When an event occurs in the IMS that matches the subscription, an appropriate notification is sent over Parlay X to the VAS. The VAS may then act on the notification and send action instructions to the IMS. The subscription is ended by sending a 'StopCallNotificationRequest' from VAS to IMS, the message including as argument the appropriate correlator.

One of the problems with the currently described functionality in OSA subscription handling is the way a subscription is stopped. The stop handler only contains the unique 'correlator' that is created at the start of the subscription. Since OSA subscriptions are not refreshed, one can assume that a subscription is started at provisioning time of users in VAS, i.e. all users provisioned within a certain time frame (e.g. each day) are sent in one subscription. [The only thing in common for these users may be the time of provisioning.]

Figure 2:
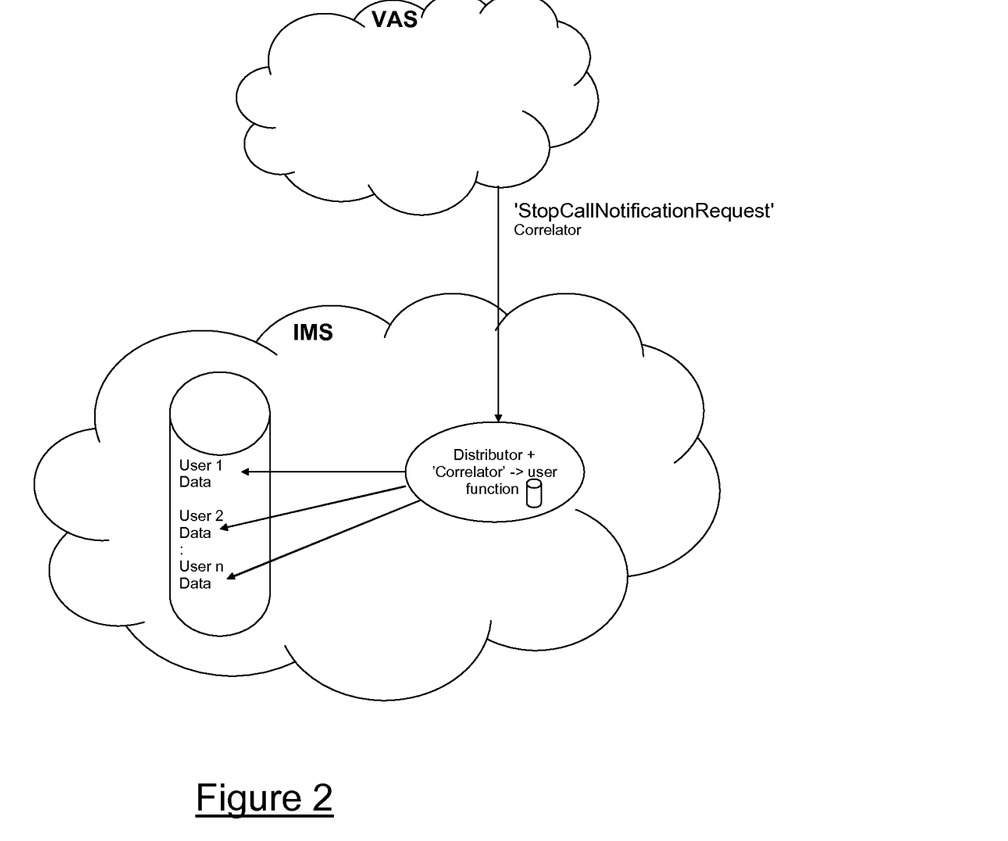
FIG. 2 illustrates schematically a prior art approach to a 3GPP Service Access (OSA) architecture.

A subscription should act as a 'trigger' in the AS for a user with an active OSA subscription. Therefore, the subscription must be tied to the user data in the AS. The AS needs functionality to step through the users in the subscription and update user data for these users. The AS must also save the pointer between the unique correlator for the subscription and the users that the correlator it is applicable to. When, later, a 'StopCallNotificationRequest' is received with only the correlator as argument, the AS must find the pointer to which users it is applicable and update user data. This subscription termination process is illustrated in FIG. 2, for a subscription made in respect of a set of three users. A function is provided within the IMS to perform a mapping between correlators and respective sets of user addresses Since in general it will be only a common subscription time that ties a group of users together, it is difficult to envisage an event that should trigger a de-subscription of the same group of users. Therefore, in order to allow de-subscribe of individual users, it is likely that real-world implementations of the proposed OSA architecture will include within a 'StartCallNotificationRequest' message only a single subscriber address, rather than a set of such addresses. Nonetheless, such implementations will still require within the IMS, functionality to point from a correlator (included in the StopCallNotificationRequest) to a user. This approach is inefficient not least because it requires one subscription message to be sent from the VAS to an AS for each and every subscriber.

Whilst the OSA architecture has to date specified only Parlay X based APIs, it is likely that in the future further handlers will be specified using other Web service interfaces. Examples of alternative possible Web service interfaces include those based upon Representational State Transfer (REST) and OneAPI. However, without adaptation of the core OSA principles, handlers using such alternative Web service interfaces would suffer from the problems discussed above.

SUMMARY

It is an object of the present invention to address and overcome the problems identified in the Open Service Access architecture and which relate to IMS subscription handling.

According to a first aspect of the present invention there is provided a method of controlling user subscriptions within an IMS Application Server of an IP Multimedia Subsystem, IMS, network, via an Open Service Access Application Programming Interface, API, between the IMS network and a web-based application. The method comprises subscribing a set of users by sending a start subscription message from said web-based application to the IMS network, the start subscription message including an address for each user in the set. An acknowledgement of the subscription is sent from the IMS network to said web-based application, the acknowledgement including a correlator uniquely identifying the subscribed set of users within the IMS network. A subscription for one or more users of the set is terminated by sending a stop subscription message from said web-based application to the IMS network, the stop subscription message including the address of the or each user for which the subscription is being stopped.

According to a second aspect of the present invention there is provided a web server for controlling user subscriptions within an IMS Application Server of an IP Multimedia Subsystem, IMS, network, via an Open Service Access Application Programming Interface, API, between the IMS network and the web server. The web server comprises a subscription setting unit for subscribing a set of users by sending a start subscription message from said web server to the IMS network, the start subscription message including an address for each user in the set, and for receiving an acknowledgement of the subscription from the IMS network, the acknowledgement including a correlator uniquely identifying the subscribed set of users. The web server further comprises a subscription unsetting unit for terminating a subscription for one or more users of the set by sending a stop subscription message to the IMS network, the stop subscription message including the address of the or each user for which the subscription is being stopped.

According to a third aspect of the present invention there is provided apparatus configured to act as an Open Service Access Application Programming Interface, API, between an IMS network and a web-based application. The apparatus comprises an interface unit for interfacing to said web based application using said Open Service Access API, and a first receiving unit for receiving a start subscription message over said interface, the message identifying a set of users to be subscribed in the IMS network, and for subscribing the set of users in the IMS. The apparatus further comprises a sending unit for sending an acknowledgement of the subscription over said interface to said web-based application, the acknowledgement including a correlator uniquely identifying the subscribed set of users within the IMS network, and a second receiving unit for receiving a stop subscription message over said interface, the stop subscription message including the address of the or each user for which the subscription is being stopped, and for stopping the subscription in the IMS for those users identified by the included addresses.

It is proposed here to include within the Parlay X message StopCallNotificationRequest, sent from a server hosting a control application to a Parlay X gateway residing in an IP Multimedia Subsystem network, an address for the or each subscriber for which a Parlay X subscription is to be stopped. The receiving Parlay X gateway parses the message to determine the address(es) and initiates termination of the associated subscription(s).

The Parlay X gateway may be implemented within an IMS Application Server within which the subscription is maintained. Alternatively, the Gateway may be implemented within a separate network entity interposed between the server hosting the control application and an IMS Application Server.

In addition to the subscriber address(es), the message may include a correlator associated with a group subscription, where the Parlay X gateway maintains a mapping between the correlator and the subscriber addresses within the group. In this way, the address(es) contained in the message may comprise all of the addresses within the group or a subset of those addresses.

Further entities ("nodes") may be interposed between the server hosting the control application (that is a "value added server") and the Parlay X gateway. For example, a distribution function may be located between the two entities for the purpose of interfacing a value added server to a plurality of IMS Application Servers. A security gateway may also, or alternatively, be located on this interface, e.g. in order to handle VASes in untrusted networks.

The approach described here may be implemented using a server that hosts a control application, e.g. a value added server (VAS), and comprises a Parlay X interface towards the Parlay X gateway. The Parlay X interface in turn comprises a message handler for constructing said StopCallNotification- Request message, such that the message includes one or more addresses for which the Parlay X subscription is to be stopped.

A Parlay X gateway may be used and which comprises a Parlay X interface towards the server hosting a control application. This Parlay X interface in turn comprises a receiver for receiving a StopCallNotificationRequest message and for parsing the message to determine subscriber addresses which it contains. The interface further comprises a subscription termination unit for terminating or initiating termination of Parlay X subscriptions associated with those addresses.

The Parlay X gateway may be implemented within an IMS Application Server, implemented in a network entity together with some other functionality, or implemented within a standalone network entity.

DETAILED DESCRIPTION

The 3GPP Open Service Access (OSA) architecture has been considered above. It has also been noted that OSA has specified a set of Parlay X based APIs or "handlers" in TS 29.199-3 V8.2.0. With reference to FIG. 1, these OSA APIs will allow web servers to interact with the IMS Application Servers (ASs) residing in the IMS Service Network.

TS 29.199-3 V8.2.0 describes in particular an OSA API that allows a web-based application to subscribe to IMS user notifications. This API would allow, for example, a web-based server to receive notifications of an incoming call for a subscribed user, and possibly implement an Intelligent Network (IN) type service such as call forwarding. This Parley X based API comprises a message for starting the subscription referred to as 'StartCallNotificationRequest'. The message is defined as:

| Part name | Part type | Optional | Description |
| --- | --- | --- | --- |
| Reference | common:SimpleReference | No | Notification endpoint definition |
| Addresses | xsd:anyURI [1 . . . unbounded] | No | Party addresses to receive notifications on. The address type/direction is determined by the AddressDirection. If the AddressDirection part is not populated this is for notifications on called party addresses. |
| Criteria | CallEvents [0 . . . unbounded] | Yes | List of Call Event values to generate notification. All event values are supported on the CallNotification manager interface. |
| Addressdirection | AddressDirection | Yes | Determine if the address considered is "called" or "calling". It applies for all the addresses. |

This message is sent by the web-based application (referred to hereinafter as a Value Added Server or VAS) to the IMS application server (AS), for example at registration of a user or users with a web-based service supported by the VAS. The VAS is of course provided with a Parlay X interface, whilst a Parlay X gateway is either installed into the IMS AS or is provided as a separate node between the IMS AS and the web interface. The interface between the Parlay X gateway and the IMS AS may be SIP based or some other internal protocol supported by the AS. In response to receipt of the StartCallNotificationRequest, the IMS AS returns to the VAS, via the Parlay X gateway, a StartCallNotificationResponse message. This message includes a "Correlator" value that uniquely identifies the subscription in the IMS AS.

Once a subscription has been made, the VAS is able to terminate the subscription via the same API, using the message termed 'StopCallNotificationRequest'. This message is currently defined in TS 29.199-3 V8.2.0 as:

| Part name | Part type | Optional | Description |
| --- | --- | --- | --- |
| Correlator | xsd:string | No | Correlator of request to end |

The Correlator is that value previously returned to the VAS by the IMS AS in the StartCallNotificationResponse. It is proposed here to change this message to the following:

| Part name | Part type | Optional | Description |
| --- | --- | --- | --- |
| Correlator | xsd:string | No | Correlator of request to end. In case the correlator is used to control the subscription, then '*' should be given as 'Addresses' |
| Addresses | xsd:anyURI [1 . . . unbounded] Or '*' (all) | Yes | Party addresses to stop notifications on. |

As well as including the Correlator, the modified StopCallNotificationRequest message includes one or more addresses (that is URIs) identifying the users to which the message relates. As will be readily apparent, the VAS may include in the "Addresses" argument only the address(es) that is (are) to be stopped. This change opens up the possibility to end a subscription on a per user (address) basis, without relying upon the Correlator. This change is partly backward compatible as a legacy IMS AS receiving such a handler can merely ignore the user addresses and act on the Correlator.

Figure 3:
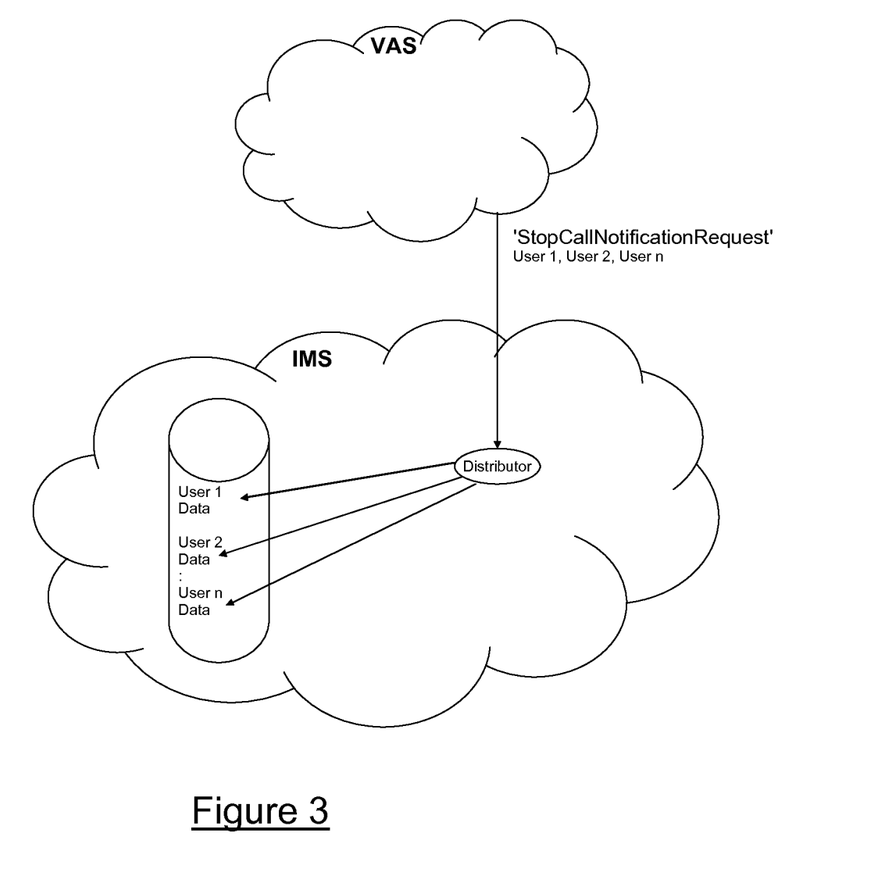
FIG. 3 illustrates schematically an approach to a 3GPP Service Access (OSA) architecture which efficiently allows termination user subscriptions on a per user basis.

If the StopCallNotificationRequest message is modified to include the individual user addresses, it is still necessary for the IMS network to parse the request and find the relevant users. There is no longer a need however to store the mapping between a 'correlator' and a set of users in the IMS. This will significantly simplify implementation of the OSA subscription handling within the IMS, and improve de-subscription handling. The modified architecture is illustrated schematically in FIG. 3. Whilst the architecture includes a "distributor", this is merely responsible for (transparently) routing the StopCallNotificationRequest message to the correct user or users, assuming that users are distributed across multiple IMS ASs within the IMS (in the example of FIG. 3, all users associated with the same AS).

In some implementations, when processing a StopCallNotificationRequest handler, the IMS network may continue to make use of the Correlator in addition to the user addresses themselves. For example, this may be desirable where a plurality of VASs are operated with the same IMS system, in which case the correlator may be stored with the user data in the IMS AS in order to find the correct VAS instance.

Figure 4:
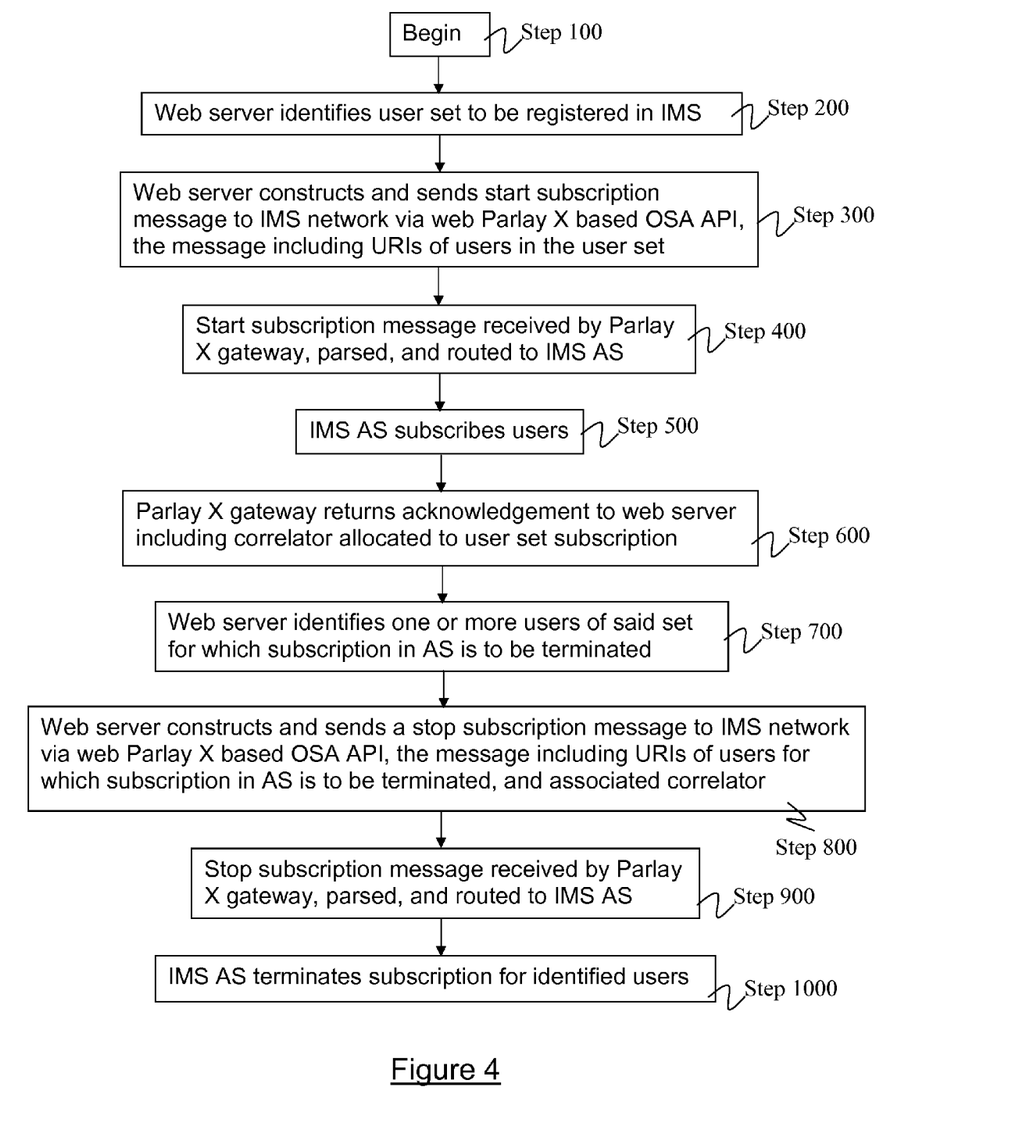
FIG. 4 is a flow diagram illustrating a process carried out within the architecture of FIG. 3.

FIG. 4 is a flow diagram illustrating a generic process of starting and stopping user subscriptions in an IMS AS using the approach described above. The steps illustrated are:

100: The process begins.

200: The web server (VAS) identifies a user set to be registered in the IMS.

300: Web server constructs and sends a start subscription message to the IMS network via web Parlay X based OSA API, the message including the URIs of users in the user set.

400: The start subscription message is received by the Parlay X gateway in the IMS. The message is parsed, and routed to the IMS AS 500: The IMS AS subscribes users.

600: The Parlay X gateway returns an acknowledgement to the web server including a correlator (value) allocated to the user set subscription.

700: The web server identifies one or more users of said set for which the subscription in the IMS AS is to be terminated 800: The web server constructs and sends a stop subscription message to the IMS network via the web Parlay X based OSA API, the message including the URIs of users for which the subscription in the AS is to be terminated, and the associated correlator.

900: The stop subscription message is received by the Parlay X gateway. The message is parsed, and routed to the IMS AS.

1000: The IMS AS terminates the subscription for identified the identified users.

Figure 5:
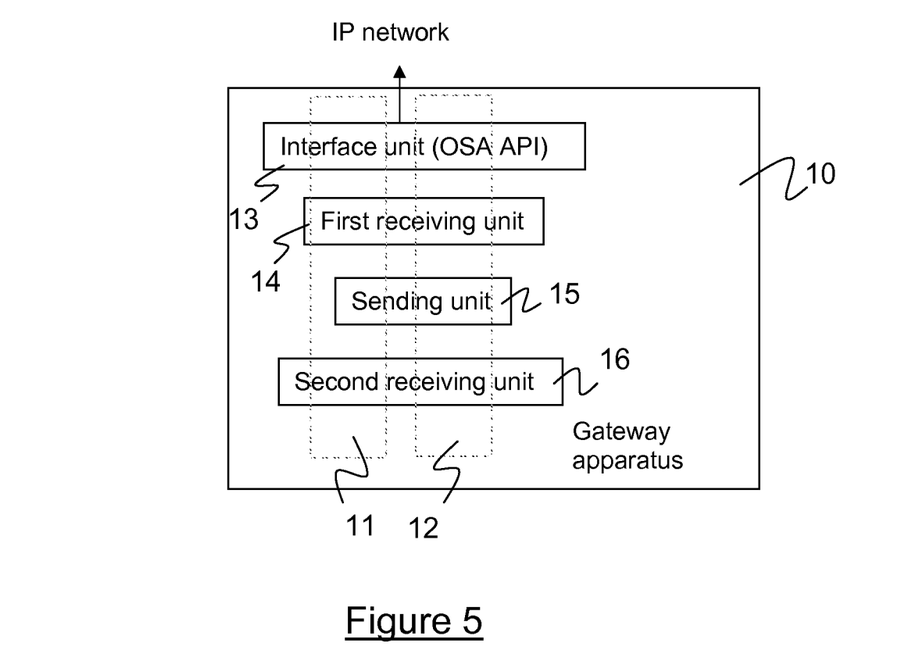
FIG. 5 illustrates schematically a gateway apparatus, for example a ParlayX gateway apparatus, for implementing a method of handling user subscriptions in an IMS network.

FIG. 5 illustrates schematically an apparatus 10 configured to act as an Open Service Access Application Programming Interface, API, between an IMS network and a web-based application. This apparatus 10 may be implemented as a standalone node under the control of the IMS network operator or may be integrated into the IMS AS implementing the subscription service (or it may be integrated into some other IMS network node). Software components 11 and hardware components 12 are provided for implementing various functional entities. These include:

An interface unit 13 for interfacing to the web based application using the Open Service Access API.

A first receiving unit 14 for receiving a start subscription message over the interface, the message identifying a set of users to be subscribed in the IMS network, and for subscribing the set of users in the IMS.

A sending unit 15 for sending an acknowledgement of the subscription over the interface 13 to said web-based application, the acknowledgement including a correlator uniquely identifying the subscribed set of users within the IMS network.

A second receiving unit 16 for receiving a stop subscription message over the interface 13, the stop subscription message including the address of the or each user for which the subscription is being stopped, and for stopping the subscription in the IMS for those users identified by the included addresses.

Figure 6:
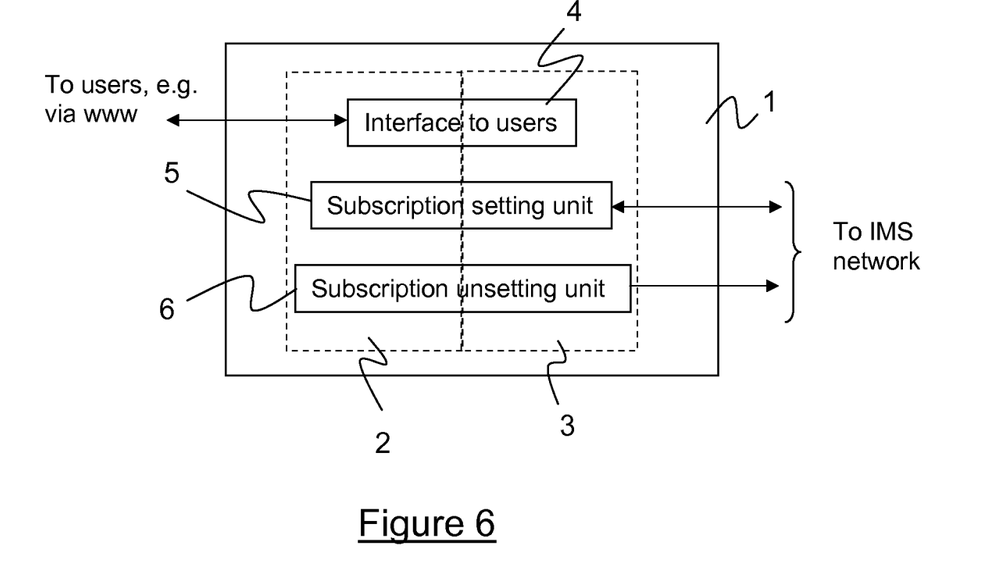
FIG. 6 illustrates schematically a web server, for example a VAS, for implementing a method of handling user subscriptions in an IMS network.

FIG. 6 illustrates schematically a web server 1 suitable for hosting a web-based application configured to implement the procedures described above. The web server comprises hardware components 2 and software components 3 which implement a number of functional units as shown. These include an interface 4 which connects the application to end users, e.g. IMS subscribers. The interface may be an interface to the www, such that users may "log on" to the application and configure their service profiles. The web server 1 further comprises a subscription setting unit 5 for subscribing a set of users by sending the start subscription message from the web server 1 to the IMS network (not shown), and for receiving an acknowledgement of the subscription from the IMS network, the acknowledgement including a correlator uniquely identifying the subscribed set of users. The web server also comprises a subscription unsetting unit 6 for terminating a subscription for one or more users of the set by sending a stop subscription message to the IMS network, the stop subscription message including the address of the or each user for which the subscription is being stopped.

It will be appreciated by the person of skill in the art that various modifications may be made to the above described embodiment without departing from the scope of the present invention. For example, rather than being a ParlayX API, the Open Service Access API may be one of a Representational State Transfer (REST) or a GSMA OneAPI based API.

The invention claimed is:

1. A method of controlling user subscriptions within an IMS Application Server of an IP Multimedia Subsystem (IMS) network, via an Open Service Access Application Programming Interface (API) between the IMS network and a web-based application, the method comprising:

subscribing a set of users by sending a start subscription message from said web-based application to the IMS network, the start subscription message comprising an address for each user in the set;

sending an acknowledgement of the subscription from the IMS network to said web-based application, the acknowledgement comprising a correlator uniquely identifying the subscribed set of users within the IMS network; and terminating a subscription for one or more users of the subscribed set of users by sending a stop subscription message from said web-based application to the IMS network, the stop subscription message comprising one or more addresses of the one or more users of the subscribed set of users for which the subscription is being stopped.

2. The method according to claim 1, wherein said Open Service Access API is a Parlay X based API.

3. The method according to claim 2, wherein said start subscription message is a "StartCallNotificationRequest", and said stop subscription message is a "StopCallNotificationRequest".

4. The method according to claim 2, wherein said IMS network comprises a Parlay X gateway coupled to, or integrated into, said IMS Application Server for sending and receiving said messages to and from said web-based application on behalf of the IMS network.

5. The method according to claim 1, wherein said Open Service Access API is one of a Representational State Transfer (REST) or a GSMA OneAPI based API.

6. The method according to claim 1, wherein said user addresses are Universal Resource Identifiers (URIs).

7. The method according to claim 1, wherein said stop subscription message includes said correlator.

8. A web server for controlling user subscriptions within an IMS Application Server of an IP Multimedia Subsystem (IMS) network, via an Open Service Access Application Programming Interface (API) between the IMS network and the web server, the web server comprising:
   a subscription setting unit for subscribing a set of users by sending a start subscription message from said web server to the IMS network, the start subscription message comprising an address for each user in the set, and for receiving an acknowledgement of the subscription from the IMS network, the acknowledgement comprising a correlator uniquely identifying the subscribed set of users; and
   a subscription unsetting unit for terminating a subscription for one or more users of the subscribed set of users by sending a stop subscription message to the IMS network, the stop subscription message comprising one or more addresses of the one or more users of the subscribed set of users for which the subscription is being stopped.

9. The web server according to claim 8 and comprising a Parlay X based Open Service Access API coupled to said subscription setting and subscription unsetting units for sending and receiving said messages to and from the IMS network.

10. The web server according to claim 8 and comprising a Representational State Transfer (REST) or a OneAPI based Open Service Access API coupled to said subscription setting and subscription unsetting units for sending and receiving said messages to and from the IMS network.

11. The web server according to claim 8, said subscription unsetting unit further comprising said correlator in said stop subscription message.

12. Apparatus configured to act as an Open Service Access Application Programming Interface (API) between an IP Multimedia Subsystem (IMS) network and a web-based application, the apparatus comprising:
   an interface unit for interfacing to said web-based application using said Open Service Access API;
   a first receiving unit for receiving a start subscription message over said interface, the start subscription message identifying a set of users to be subscribed in the IMS network, and for subscribing the set of users in the IMS network;
   a sending unit for sending an acknowledgement of the subscription over said interface to said web-based application, the acknowledgement comprising a correlator uniquely identifying the subscribed set of users within the IMS network; and
   a second receiving unit for receiving a stop subscription message over said interface, the stop subscription message comprising one or addresses of one or more users of the subscribed set of users for which the subscription is being stopped, and for stopping the subscription in the IMS network for the one or more users identified by the one or more addresses in the stop subscription message.

13. The apparatus according to claim 12, wherein said Open Service Access API is a ParlayX API.

14. An IP Multimedia Subsystem (IMS) Application Server comprising the apparatus according to claim 12.

15. The method according to claim 1, wherein:
   the web-based application is a different entity than the set of users; and
   the set of users are a plurality of users and the one or more users are less than the plurality of users.

16. The web server according to claim 8, wherein:
   the web server is a different entity than the set of users; and
   the set of users are a plurality of users and the one or more users are less than the plurality of users.

17. The apparatus according to claim 12, wherein:
   the web-based application is a different entity than the set of users; and
   the set of users are a plurality of users and the one or more users are less than the plurality of users.

18. A method in a web server for controlling user subscriptions within an IMS Application Server of an IP Multimedia Subsystem (IMS) network, via an Open Service Access Application Programming Interface (API) between the IMS network and the web server, the method comprising:
   subscribing, by the web server, a set of users by sending a start subscription message from said web server to the IMS network, the start subscription message comprising an address for each user in the set;
   receiving, by the web server, an acknowledgement of the subscription from the IMS network, the acknowledgement comprising a correlator uniquely identifying the subscribed set of users; and
   terminating, by the web server, a subscription for one or more users of the subscribed set of users by sending a stop subscription message to the IMS network, the stop subscription message comprising one or more addresses of the one or more users of the subscribed set of users for which the subscription is being stopped.

19. The method according to claim 18, wherein the web server comprises a Parlay X based Open Service Access API for sending and receiving said messages to and from the IMS network.

20. The method according to claim 18, wherein the web server and comprising a Representational State Transfer (REST) or a GSMA OneAPI based Open Service Access API for sending and receiving said messages to and from the IMS network.

21. The method according to claim 18, wherein said stop subscription message further comprising said correlator.

22. The method according to claim 8, wherein:
   the web server is a different entity than the set of users; and
   the set of users are a plurality of users and the one or more users are less than the plurality of users.

23. A method in an apparatus for acting as an Open Service Access Application Programming Interface (API) between an IP Multimedia Subsystem (IMS) network and a web-based application, the method comprising:
   interfacing, by said apparatus, to said web-based application using said Open Service Access API;
   receiving, by said apparatus, a start subscription message over said interface, the start subscription message identifying a set of users to be subscribed in the IMS network, and for subscribing the set of users in the IMS network;
   sending, by said apparatus, an acknowledgement of the subscription over said interface to said web-based application, the acknowledgement comprising a correlator uniquely identifying the subscribed set of users within the IMS network;
   receiving, by said apparatus, a stop subscription message over said interface, the stop subscription message comprising one or more addresses of one or more users of the subscribed set of users for which the subscription is being stopped; and stopping, by said apparatus, the subscription in the IMS network for the one or more users identified by the one or more addresses in the stop subscription message.

24. The method according to claim 23, wherein said Open Service Access API is a ParlayX API.

25. The method according to claim 23, wherein:
the web-based application is a different entity than the set of users; and
the set of users are a plurality of users and the one or more users are less than the plurality of users.

26. A web server configured to control user subscriptions within an IMS Application Server of an IP Multimedia Subsystem (IMS) network, via an Open Service Access Application Programming Interface (API) between the IMS network and the web server, the web server comprising:
at least one processor; and,
at least one memory that stores processor-executable instructions, wherein the at least one processor interfaces with the at least one memory to execute the processor-executable instructions, whereby said web server is operable to:
subscribe a set of users by sending a start subscription message from said web server to the IMS network, the start subscription message comprising an address for each user in the set;
receive an acknowledgement of the subscription from the IMS network, the acknowledgement comprising a correlator uniquely identifying the subscribed set of users, wherein the subscribed set of users comprises a plurality of users; and
terminate a subscription for one or more users of the subscribed set of users by sending a stop subscription message to the IMS network, the stop subscription message comprising one or more addresses of the one or more users of the subscribed set of users for which the subscription is being stopped.

27. The web server according to claim 26, wherein:
the web server is a different entity than the set of users; and
the set of users are a plurality of users and the one or more users are less than the plurality of users.

28. An apparatus for acting as an Open Service Access Application Programming Interface (API) between an IP Multimedia Subsystem (IMS) network and a web-based application, the apparatus comprising:
at least one processor; and,
at least one memory that stores processor-executable instructions, wherein the at least one processor interfaces with the at least one memory to execute the processor-executable instructions, whereby said apparatus is operable to:
interface to said web-based application using said Open Service Access API;
receive a start subscription message over said interface, the start subscription message identifying a set of users to be subscribed in the IMS network, and for subscribing the set of users in the IMS network, wherein the set of users comprises a plurality of users;
send an acknowledgement of the subscription over said interface to said web-based application, the acknowledgement comprising a correlator uniquely identifying the subscribed set of users within the IMS network;
receive a stop subscription message over said interface, the stop subscription message comprising one or more addresses of one or more users of the subscribed set of users for which the subscription is being stopped; and
stop the subscription in the IMS network for the one or more users identified by the one or more addresses in the stop subscription message.

29. The apparatus according to claim 28, wherein:
the web-based application is a different entity than the set of users; and
the set of users are a plurality of users and the one or more users are less than the plurality of users.

* * * * *